United States Patent [19]

Holmgren

[11] Patent Number: 4,915,960
[45] Date of Patent: * Apr. 10, 1990

[54] DIETARY FIBER PRODUCT

[75] Inventor: Lennart Holmgren, Ängelholm, Sweden

[73] Assignee: Tricum AB, Hoganas, Sweden

[ * ] Notice: The portion of the term of this patent subsequent to Aug. 23, 2005 has been disclaimed.

[21] Appl. No.: 168,283

[22] Filed: Mar. 15, 1988

Related U.S. Application Data

[60] Division of Ser. No. 927,468, Nov. 6, 1986, Pat. No. 4,765,994, which is a continuation-in-part of Ser. No. 797,189, Nov. 12, 1985, abandoned, which is a continuation of Ser. No. 578,197, Feb. 8, 1974, abandoned.

[30] Foreign Application Priority Data

Feb. 23, 1983 [SE] Sweden ................................ 8300981

[51] Int. Cl.$^4$ .............................................. A23L 1/42
[52] U.S. Cl. ........................................ 426/31; 426/804
[58] Field of Search ............... 426/804, 618, 49, 21, 426/31, 51, 627

[56] References Cited

U.S. PATENT DOCUMENTS

| | | | |
|---|---|---|---|
| 3,395,019 | 7/1968 | Kviesitis | 426/31 |
| 3,449,130 | 6/1969 | Blanchon | 426/31 |
| 3,573,061 | 3/1971 | Glabe | 426/804 |
| 4,181,747 | 1/1980 | Kickle | 426/521 |
| 4,282,319 | 8/1981 | Conrad | 426/28 |
| 4,341,805 | 7/1982 | Chaudhary | 426/481 |
| 4,565,702 | 1/1986 | Morley | 426/302 |
| 4,619,831 | 10/1986 | Sharma | 426/93 |
| 4,765,994 | 8/1988 | Holmgren | 426/804 |

FOREIGN PATENT DOCUMENTS

| | | |
|---|---|---|
| 0166824 | 1/1986 | European Pat. Off. . |
| 2345806 | 3/1975 | Fed. Rep. of Germany . |
| 2629773 | 4/1976 | Fed. Rep. of Germany . |
| 2446872 | 1/1978 | Fed. Rep. of Germany . |
| 2837294 | 3/1979 | Fed. Rep. of Germany . |
| 2424029 | 11/1979 | France . |
| 188663 | 2/1981 | New Zealand . |
| 593516 | 10/1947 | United Kingdom . |
| 1170836 | 11/1969 | United Kingdom . |
| 1570513 | 7/1980 | United Kingdom . |

OTHER PUBLICATIONS

*Fiberform* brochure.

*Primary Examiner*—Carolyn Paden
*Attorney, Agent, or Firm*—Armstrong, Nikaido, Marmelstein, Kubovcik & Murray

[57] ABSTRACT

The present invention relates to dietary fiber based on the husks or outer parts of grain, wherein the fiber content exceeds 70% and the content of phytic acid is less than 0.5% by weight.

1 Claim, No Drawings

DIETARY FIBER PRODUCT

This application is a divisional of application Ser. No. 927,468 filed Nov. 6, 1986 now U.S. Pat. No. 4,765,994. Application Ser. No. 927,468 is a continuation-in-part of application Ser. No. 797,189 filed Nov. 12, 1985, which, in turn, is a continuation of application Ser. No. 578,197 filed Feb. 8, 1984. The applications, Ser. Nos. 797,189 and 578,197, are now abandoned.

BACKGROUND OF THE INVENTION

The present invention relates to a dietary fibre product, more particularly to a dietary fibre product based on the husks of grain.

It is nowadays considered that a low fibre diet is responsible for many of our most frequent welfare diseases, such as obstipation, diverticula diseases, colonitis, haemorrhoids, cancer coli and gallstones. The consumption of dietary fibre prevents the occurrence of the above-mentioned diseases and can be used in the treatment thereof. It is also effective in the prevention of other diseases such as diabetes melitus type II, arteriosclerosis and obesity.

By dietary fibre is meant those parts of plant cell walls which pass through the alimentary canal without being affected by enzymes. Plant fibre has four main constituents, i.e. cellulose, hemicellulose, pectin and lignin. In the large intestine or colon it is primarily the hemicellulose and pectin which are broken down by enzymes to form free fatty acids, lactic acid and gases. These substances cannot be resorbed by the human body and instead cause irritation with osmotic activity, which has a laxative effect.

There are several compositions, such as wheat bran, on the market which are stated to have all the favourable properties of dietary fibre. However, wheat bran contains only between 25 and 35% fibre, the rest being starch, protein, fat and ashes. This low fibre content results in a high energy value in comparison with equivalent doses of concentrated fibre compositions.

Furthermore, wheat bran is a residual product and the bacteria content may be extremely high in the order of 50,000 units/gram and a high moisture content, that is above 12%. After a moisture content of 9–10%, the bacteria are actively growing, and therefore this raw material has very low keeping qualities. The phytic acid content in wheat bran is also high, thus impeding the absorption of minerals in humans since a chelate complex is formed between the phytic acid and the minerals.

Bulk agents are primarily used in the medical treatment of constipation, examples being psyllium-based agents sold under the trade names Lunelax ®, Metamucil ® and Vi-Siblin ® and the rubber composition Inolaxol ®. The dietary fibre in these products consists almost entirely of water-soluble hemicellulose. There are also a number of problems and drawbacks associated with these bulk agents in that they offer no documentation of the fibre content, with complicates dosing, they are expensive and are less efficient than wheat bran. Furthermore, these agents are not very congenial since when mixed with liquid they form a gel or mucilage which is found unpalatable, they have a high sugar content and have been known to cause allergies and obstructions in the oesophagus caused by the considerable formation of gel. It should be noted that frequent and protracted use of bulk agents of this type results in drastically increased caries activity due to the sugar content in the products and their gel-forming properties, causing them to adhere to the teeth. The high energy content should also be noted and the fact that the fibres do not occur naturally in our diet, but are obtained from an Indian plant.

SUMMARY OF THE INVENTION

It is an object of the present invention to provide dietary fibre product based on natural substances.

According to the invention, there is provided a dietary fibre product based on the husks of grain, in which the content of dietary fibre (as herein defined) exceeds 70% by weight.

The phytic acid content of the dietary fibre product of the invention is preferably 0.5%, or less, by weight so that the inhibiting effect of the dietary fibre product on the absorption of iron, calcium and zinc is negligible. These minerals are of particular importance for pregnant women, growing children, for the healing of wounds, etc. Due to the low phytic acid content, therefore, larger quantities of the dietary fibre product can be consumed with less risk of reducing the ability to absorb minerals.

DESCRIPTION OF THE PREFERRED EMBODIMENT

In a preferred embodiment of the invention the dietary fibre product is derived from husks of wheat grain and comprises at least 70% by weight of fibre, and the product comprises the following constituents in the proportions noted:

cellulose: 18% by weight
hemicellulose: 35% by weight
pectin: 4% by weight
lignin: 13% by weight
max. 8% by weight protein
max. 5% by weight fat
max. 2% by weight minerals and
max. 0.5% by weight phytic acid As is evident from the analysis, the dietary fibre product according to this preferred embodiment of the invention has a low energy content and contains no sugar or starch which can be broken down to produce energy.

The protein portion in the dietary fibre is not accessible to human enzymes and cannot therefore in principle be broken down to produce energy.

The fibre content of a dietary fibre product according to the invention is preferably at least 80% by weight.

The product is also preferably in the form of particles, with at least 80% of the particles having a size between 0.2 and 2 mm, the mean particle size being approximately 1 mm. The particle size is important since decomposition in the colon is lower for these larger particles than for wheat bran, for instance. Furthermore, this range of particle size makes the product easier to consume orally. While wheat bran has a bitter taste, the preferred form of dietary fibre embodying the invention is substantially tasteless and can be eaten with a variety of foods such as sour milk, bread and so on. Because of the high fibre content, a product according to the invention produces a better clinical effect from a lower dose, as compared with known products. The dust-forming tendency of the preferred form of the product is also reduced as compared with known products since it is in the form of large particles. However, the fact that the fibre is substantially free of sugar and starch is also relevant to dust formation since freedom from these substances makes the product less brittle than known products.

The preferred form of dietary fibre product embodying the invention has also better keeping qualities than comparable products on the market, partly due to its low content of water, i.e. below 7% and microorganisms underneath 1,000 units/gram, which gives very good keeping qualities. There is no risk for bacteria growth in the product according to the invention.

The structure of the dietary fibre particles in a product embodying the invention has a cleaning effect on the teeth. This is partly due to mechanical action and partly because the bacteria forming plaque (streptococcus mutans) are bound to the fibre and do not adhere to the teeth.

Although the dietary fibre according to the invention is preferably manufactured in particle form, it need not necessarily be distributed in this form. The particles can be treated to give the product a granular or flake form. Tablets may also be produced by the addition of a binder followed by pressing. Many people prefer to consume dietary fibre in tablet form rather than mixing it in particle form with sour milk, water, etc. By using a suitable binder, and utilizing a suitable degree of compression, etc. it is possible to ensure that the tablet will not dissolve before reaching the stomach.

The dietary fibre of the invention can be prepared by the enzymatic degradation of phytic acid, protein and starch, followed by washing and drying. For example, the grain fibre such as wheat bran is mixed with water, the temperature of the mixture is regulated to 50°–60° C., and pH is adjusted to about 5.0, e.g. with sulphuric acid. The mixture is agitated for 6 to 10 hours, during which time the phytic acid content in the fibre is degraded by phytase, which is a naturally occurring enzyme in the grain fibre.

The pH value in the mixture from which phytic acid has been removed, is increased to about 6.0, e.g. by the addition of NaOH. A proteinase enzyme such as Neutras ® or Alcalas ® from Novo, Denmark, is added for the degradation of proteins. The temperature is maintained at 50°–60° C. for about 2–4 hours.

After the degradation of phytic acid and protein, the temperature is increased to about 70°–75° C. and amylase, e.g. BAN ® from Novo, Denmark, is added for the degradation of starch. The reaction takes from 0.5 to 3 hours and pH is held constant at about 6.0 during the reaction.

In order to end the enzymatic reactions and to produce a product without any enzymatic residue and with a low bacteria content, the temperature is then increased to 95°–100° C. and is maintained at this level for about half an hour.

The product obtained is washed several times with water, dewatered, and then fed to a dryer where the desired water content is realized. The washing step can be performed before the elevated temperature anzyme residue destruction step.

The properties of a dietary fibre product embodying the invention are illustrated and discussed below in relation to various tests which have been conducted.

Test 1—Swelling Effect

The swelling effect of water on dietary products embodying the invention and various types of wheat bran was tested by placing a 1 gram sample of the respective material in a graduated cylinder, then adding water at a temperature of 20° C. to bring the total volume in the cylinder to 100 ml. The swelling effect was then assessed by checking volume of the material, by means of the milli-liter graduation on the cylinder, after ½, 1, 12 and 24 hours. The results are given in Table I below.

TABLE I

| Product | Swelling effect in ml | | | |
|---|---|---|---|---|
| | ½ hour | 1 hour | 12 hours | 24 hours |
| Dietary fibre embodying the invention | 17 | 17 | 17 | 17 |
| Juvel's wheat bran | 11 | 9 | 9 | 9 |
| Kungsornen's wheat bran | 5 | 5 | 5 | 5 |
| Kungsornen's mixed grain bran | 11 | 10 | 10 | 0 |

It can be seen from the above table that the dietary fibre product embodying the invention has an excellent swelling effect. One gram swells to 17 ml and the product maintains this swelling effect even after 24 hours.

Test 2—Water Retention

The water retaining ability of various dietary fibre compositions was measured by allowing the composition under test to be saturated with water at a temperature of 20° C. for one hour. The composition was then allowed to drain through a filter paper. The fibre, with the water bound to it, remaining on the paper was then transferred to a watch-glass and weighed. This gave the water-binding capacity of the dietary fibre product. The results are shown in Table II.

TABLE II

| Composition | Initial Quantity in g | Weight of Sample in g | Quantity H₂O in g | Ratio |
|---|---|---|---|---|
| Dietary fibre embodying the invention | 3.5 | 27.0 | 23.5 | 6.7:1 |
| Vi-Siblin ® | 6.0 | 54.1 | 48.1 | 8.0:1 |
| Lunelax ® | 6.6 | 76.6 | 70.0 | 10.6:1 |
| Inolaxol ® | 5.0 | 81.5 | 76.5 | 15.3:1 |
| Wheat bran, Kungsornen | 3.5 | 15.8 | 12.3 | 4.5:1 |
| | 10.0 | 42.5 | 32.5 | 4.3:1 |
| | 12.0 | 50.5 | 38.5 | 4.2:1 |
| Mixed grain bran, Kungsornen | 3.5 | 13.5 | 10.0 | 3.8:1 |
| | 7.0 | 26.0 | 19.0 | 3.7:1 |
| | 10.0 | 35.0 | 25.0 | 3.5:1 |

Since substantially all starch and a certain amount of protein has been removed, the fibre content is at least 70% in the dietary fibre product embodying the invention. This means that the dietary fibre product embodiment the invention has clearly better water-binding capacity than the comparative bran products.

On the other hand, the psyllium-based products, which also contain 40–50% sugar, have even better water-binding capacity. This is probably mainly due to their chemical composition and to the water soluble hemicellulose of which they are almost entirely composed. However, these products cannot be compared with the dietary fiber product according to the invention and have only been included for information.

The results obtained in Tests 1 and 2 are significant, since high swelling and water-retention in the product result in an increased volume of excrement and produce softer excrement.

Test 3—Effect and Tolerance

The object was to investigate the effect of a dietary fibre product embodying the invention on patients with colonitis or obstipation who have previously been treated with bulk laxatives (Lunelax ® or Vi-Siblin ®), and their tolerance to the product.

Twenty-two patients participated in the experiments, fifteen men and seven women (aged 25-81 years). Obstipation had been diagnosed for fourteen of the patients and colonitis for eight of them. The disease had persisted for at least ten weeks.

The patients were treated with a dietary fibre product embodying the invention for three weeks. Prior to treatment and again after treatment, records were made on the basis of interviews with the patients as to defecation frequency, consistency of feces, subjective problems and the patients' opinion as to the state of the disease. After treatment, the patients were questioned as to the palatability of the product and their impression of the result of the treatment.

The dietary fibre embodying the invention was administered in doses of 3.5 g×2.

Initially, all patients with colonitis experienced frequent, loose evacuation. After the treatment, six of them evacuated feces of normal consistency and two of loose consistency. Of the patients suffering from obstipation, twelve defecated every two or three days and two defecated less frequently than every third day. The consistency of the feces for three of the patients was normal; for eleven it was hard. After three treatments with the product embodying the invention, seven patients defecated every day and seven every second or third day. The consistency of the feces was normal for ten patients and hard for four. For both groups of patients the symptoms assessed in points were reduced from 38 to 17. Prior to treatment two patients considered themselves to be in an extremely bad way, twelve as not too bad and eight as problem-free. Six found the taste of the dietary fibre unpleasant whereas the remaining 16 considered the taste to be natural, pleasant or very pleasant. 14 patients considered the treatment to be satisfactory or extremely satisfactory, whereas the doctor considered the result to have been satisfactory or very satisfactory for 16 patients.

The results indicate that the dietary fibre embodying the invention in the doses administered, had a normalizing effect on the consistency and frequency of the feces and that is palatability was not less than for the bulk agents (Lunelax ®, Vi-Siblin ®) currently on the market.

Test 4—Effect and Tolerance

The object was to study the effect of a dietary fibre product embodying the invention on obstipated children, and their tolerance to it.

20 patients, 14 of whom were girls and 6 of whom were boys, aged 10 months up to 11 years took part in the experiment. The criteria for inclusion were that the patients had suffered from obstipation for at least two months and that the patients had previously been treated with changes in diet or bulk laxatives The patients or their parents were interviewed before treatment as to frequency and consistency of feces, quality of defecation, abdominal pain and consumption of other laxatives. For each patients the dietician also recorded a diet anamnesis. Treatment with a dietary product embodying the invention was carried out for one month, after which time the patients were again interviewed. As far as possible, the patient continued, in other respects, with their normal diet during treatment with the dietary fibre product embodying the invention.

Doses of from 1.7 to 3.5 g per day were administered.

Diet anamnesis indicated that four of the children consumed small quantities of vegetables whereas all of them consumed fruit in some form almost daily. Three of the children consumed too much milk and one child ate bread deficient in fibre.

Prior to treatment 11 out of 19 children defecated at three day intervals or even less frequently. After one month's treatment with the dietary fibre product 10 of the 19 children defecated daily and six every other day. Initially 18 children experienced pain during defecation. After one month's treatment with the dietary fibre product embodying the invention, only four children had slight pain during defecation. Increased defecation frequency was experienced by 16 or 18 children. The consistency of the feces became normal in 16 cases. Twelve children had abdominal pain before the treatment, but this disappeared in all except two cases resistant to therapy. Prior to treatment twelve children used bulk agents, ten children used peroral irritants and six rectal laxative. After a month of treatment, however, only four of these twelve children required other laxatives together with the dietary fibre embodying the invention. Most of the children found the taste of the dietary fibre product embodying the invention to be neutral and accepted the composition well. One child considered that the dietary fibre product did not taste pleasant and therefore terminated the treatment. This child is therefore not included in the results.

Side effects in the form of swollen abdomen and increased flatulence were noted initially but disappeared in a week.

The investigation thus shows that treatment with the dietary fiber product embodying the invention produced favourable results as to the number of defecations, quality and consistence of the feces, in obstipated children from 10 months to 11 years of age. As evacuated habits were normalized, abdominal pain also disappeared.

During treatment with the dietary fibre product embodying the invention, the use of other laxatives was reduced and only one child with extremely aggravated obstipation needed to use a supplementary laxative. The composition embodying the invention was tolerated well.

Test 5—Effect of Plasma Cholesterol

Studies have shown that the consumption of dietary fibre products embodying the invention can alter the plasma-lipoprotein pattern of patients suffering from hypercholesterolemaemia. To establish the reason for these positive effects, the adsorption ability of bile salts has been investigated in vitro for dietary fibre embodying the invention, psyllium (Lunelax ®, Metamucil ® and Vi-Siblin ®) and for Cholestyramin (Questran ®) which is an ion-exchanger and not a dietary fibre. Cholestyramin is a registered medicine for binding bile salts through its ion-exchanging ability.

These investigations showed that the dietary fibre embodying the invention had a high ability to adsorb both conjugated and unconjugated bile salts. The adsorption process was saturatable, reversible and showed no specificity with respect to tauro-conjugated or glycine-conjugated or bile salts. Binding was rapid, pHdependent and inhibited to a certain extent at high salt concentrations, with 6M urea. This indicates that binding is both hydrophobic and hydrophilic. The dietary fibre product embodying the invention adsorbed sodium taurodeoxycholate to a significantly greater extent than was the case with psyllium (Lunelax ®, Metamucil ®, Vi-Siblin ®). Cholestyramin (Questran ®), however, had the most pronounced adsorbency of the compositions compared in this respect.

The results show that the dietary fibre product embodying the invention adsorbs both tauro-conjugated and glycine-conjugated bile salts to a greater extent that other dietary fibres. The mechanism behind the positive effects of the dietary fibre product embodying the invention on plasma-cholesterol may be assumed to be due to inhibition of readsorption of bile salts in the distal intestines, resulting in increased decomposition of cholesterol in the bile acid synthesis.

Test 6—Perishability

The perishability of a dietary fibre product embodying the invention was investigated in storage tests at 25° C. and 45°.

200 gram samples of the fibre product were placed in unsealed polythene bags and stored at 25° C. for 24 months and 200 gram samples of the fibre were placed in open glass jars and stored at 45° C. for 24 months.

The chemical reaction rate is doubled for a temperature increase of 10° C. and storage for 24 months at 45° C. is therefore equivalent to storage for 96 months at 25° C.

To ascertain the perishability of the product, the following were examined:
alteration in fibre content
hygroscopicity and
alteration in taste and smell No change in fibre content could be discerned after storage at normal or increased temperature.

No change in weight could be detected in the stored material.

Small and taste were judged to be the same at the various testing times and were characterized as a faint smell and taste of grain.

Thus it is possible to produce, in accordance with the invention, a dietary fibre product which increases the volume of excrement and makes it softer, reduces time of passage through the intestines, binds organic compounds, absorbs bile salts, lowers the blood lipid content, influences carbohydrate metabolism and gives an enhanced feeling of satisfaction.

Furthermore, such a product can be made to be palatable to the consumer and to have substantially no taste.

The product of the invention can be prepared as follows:

Into a processing tank is introduced 10,000 liters of water at a temperature of 55° C. 19 kg sulphuric acid is added with the aid of a metering pump and thereafter 1,400 kg wheat bran is introduced with a transporting device. The resulting pH is about 5.0. The mixture is agitated for 6 hours and the phytic acid is degraded by the phytase, which is naturally present in the raw material bran from the milling industry. After 6 hours, the pH is increased to 6.0 by the addition of NaOH. Thereafter 4 liters of Neutras ® are added for the degradation of proteins. The temperature is held constant at 55° C. for 2 hours. Then the temperature is increased to 75° C. and 2 liters of amylase, BAN ®, are added for the degradation of starch. The reaction time after reaching the temperature of 75° C. is 1 hour. The pH is constantly held at 6.0. Thereafter, the temperature is further increased to almost boiling temperature (about 95° C.) and is maintained at this level for half an hour.

The product is then fed to a washing system, in this case with three rotating chemical sieves, a press and a decanter, with auxiliary equipment such as balancing tanks, agitators, pumps, etc. The fibres are washed and filtered in several steps, are dewatered in the press to about 40% solids content and are then transferred to the dryer. The fibres lost to the water in the press are recovered in the decanter as a fibre/water mixture with a solids content of about 30%, which is fed to the dryer. The fibres are dried in a flow of hot air in which the fibres are fluidized for a time period sufficient to lower the water content to a desired level. Thereafter, the product is transported with a hot gas stream to a cyclone, wherein it is separated as a final product. Before leaving the dryer system, the product is cooled to room temperature.

A dietary fibre product embodying the invention may be used as means of regulating intestinal movement, as a cure for obstipation, diverticula diseases, colonitis, haemorrhoids, anal fissures, diabetes mellitus type II, and gallstones, as a prophylactic agent against obstipation, diverticula diseases, colonitis, haemorrhoids, anal fissures, diabetes mellitus type II, and gallstones, and for pre-operative and post-operative inteneration of the feces. Such a product may also be used for cleansing the colon prior to a coloscopy.

What is claimed is:

1. A water absorbing dietary fibre product comprising at least 80% by weight of dietary fibre, less than 0.5% by weight of phytic acid, no more than 8% by weight protein, no more than 4% by weight fat and no more than 2% by weight minerals, said product being obtained by a process comprising mixing wheat bran with aqueous acid of pH about 5 and maintaining the mixture at a temperature of about 50°-60° C. for a time sufficient to permit the naturally occurring phytase in the raw material bran to reduce the naturally occurring phytic acid content to below about 0.5%; increasing the pH to about 6; adding a proteinase to the pH adjusted mixture at about 50°-60° C. and maintaining the resultant mixture at this temperature until the protein content has been reduced to about 8% or less; increasing the temperature to about 70°-75° C. and adding a starch degrading enzyme to the mixture and maintaining the resultant mixture at a temperature and for a time sufficient to permit the starch degrading enzyme to degrade substantially all of the starch in the mixture; increasing the temperature of the mixture containing the starch degrading enzyme sufficient to halt the enzymatic reactions and removing the water from the mixture and drying the resultant product.

* * * * *